United States Patent [19]

Glaser et al.

[11] Patent Number: 5,271,632
[45] Date of Patent: Dec. 21, 1993

[54] HYDRO-PNEUMATIC WHEEL SUSPENSION

[75] Inventors: Fritz Glaser, Zweibruecken; Roman Munz, Mannheim, both of Fed. Rep. of Germany

[73] Assignee: Deere & Company, Moline, Ill.

[21] Appl. No.: 978,648

[22] Filed: Nov. 19, 1992

[30] Foreign Application Priority Data

Nov. 21, 1991 [DE] Fed. Rep. of Germany ....... 4138208

[51] Int. Cl.⁵ .................. B60G 17/015; B60G 21/073
[52] U.S. Cl. .................................. 280/6.12; 230/708; 230/714
[58] Field of Search ..................... 280/714, 708, 612

[56] References Cited

U.S. PATENT DOCUMENTS

| | | |
|---|---|---|
| 3,353,815 | 11/1967 | Henry-Biabuad. |
| 3,468,554 | 9/1969 | Parkes ................... 280/707 |
| 4,555,120 | 11/1985 | Frait et al. ............... 280/707 |
| 4,580,797 | 4/1986 | Ericsson ................. 280/6.12 |

FOREIGN PATENT DOCUMENTS

| | | |
|---|---|---|
| 1129845 | 5/1962 | Fed. Rep. of Germany. |
| 2807299 | 8/1979 | Fed. Rep. of Germany. |
| 3609534 | 4/1987 | Fed. Rep. of Germany. |
| 3742833 | 6/1989 | Fed. Rep. of Germany. |
| 3834693 | 6/1989 | Fed. Rep. of Germany. |
| 2621866 | 4/1989 | France ................... 280/714 |
| 62-289419 | 12/1987 | Japan .................... 280/708 |
| 3-262720 | 11/1991 | Japan .................... 280/714 |

*Primary Examiner*—Karin L. Tyson

[57] ABSTRACT

A wheel suspension for a vehicle, in particular for utility and agricultural vehicles, has a hydro-pneumatic spring system arranged between a vehicle body and a wheel support that includes at least one hydraulic cylinder, a hydraulic accumulator arrangement and an intervening valve arrangement. The hydro-pneumatic spring system contains at least two hydraulic accumulators. The hydraulic accumulators can be connected individually or in groups of more than one with the one or more hydraulic cylinders selectively by means of the valve arrangement. Preferably at least two of the hydraulic accumulators are provided with differing preloads. In addition load-sensitive damping, a blocking valve and a level control valve that can be controlled by a level control linkage with switches are provided.

14 Claims, 5 Drawing Sheets

HYDRO-PNEUMATIC WHEEL SUSPENSION

BACKGROUND OF THE INVENTION

1 Field of the Invention

The present invention concerns the wheel suspension for a vehicle, in particular for utility or agricultural vehicles, with a hydro-pneumatic spring system arranged between the vehicle body and the wheel support.

2. Description of the Related Art

Wheel suspensions for vehicles frequently include at least one hydraulic cylinder, a hydraulic reservoir arrangement and an intervening valve arrangement, e.g., as shown in DE 28 07 299.

DE 38 34 693 describes a tractor with a steerable rigid axle supported a transverse control arm. A vertical spring damper is provided between the front axle support and the transverse control arm, and includes a spring loaded hydraulic cylinder. Damping is provided by a throttling restriction arranged in the connection between the hydraulic cylinder and a hydraulic reservoir. Furthermore, a two-way valve also is arranged in the connection which selectively blocks the spring damper by blocking the supply or return flow to the hydraulic cylinder. This known spring arrangement is effective only in a limited pre-set load range, dependent upon the operating range of the hydraulic reservoir. For support loads outside this load range no spring loaded wheel suspension is provided.

Especially in utility and agricultural vehicles, the axle loading or the contact forces of the vehicle body upon a spring-loaded axle may vary within wide limits due to changes in the load. In tractors with a mid-range load capacity, the load applied by the body to the front axle can reach 4000 Newtons in plowing and 48,000 Newtons in front loader operations, so that the maximum load required is 12 times the minimum load. These varying loads must be absorbed by spring arrangements with appropriate spring forces and appropriate hydraulic damping forces. Use of a spring arrangement for the front axle is especially recommended in tractors with a high top speed, both to improve the driving safety of the tractor and to increase operator comfort.

Experience in vehicle technology has shown that the natural frequencies of the vehicle body should be kept nearly constant under all load conditions. As a result of this rule the spring rate and the damping rate must be made approximately proportional to the change in load.

It is known from truck practice to supply the required amount of air from an air compressor through an air reservoir to air springs in order to cover varying load conditions. In many vehicles, in particular in tractors, no compressed air system is available, so that here the truck solution would be too costly. Furthermore, air springs have a considerably greater space requirement than do hydro-reservoir systems due to their relatively low internal pressure, and the required space is frequently not available.

SUMMARY OF THE INVENTION

The object of the present invention is to define a hydro-pneumatic wheel suspension that is able to absorb highly variable support loads, which improves operating safety and operator comfort and that overcomes the aforementioned problems. In particular the hydro-pneumatic spring system should contain a largely unchanging gas volume at all load conditions, so that the spring system operates almost as a system with constant gas volume.

These objects are achieved by providing a hydro-pneumatic spring system with several hydraulic accumulators with differing volumes and/or pre-loads (internal pressures).

With accumulators with different pre-loads, the appropriate accumulator can be connected with the hydraulic cylinder based on the load to be supported. This permits adjustment to varied load conditions and an approximately ideal spring characteristic for these load conditions.

Further, while the various hydraulic accumulators can have different pre-loads, it is not required. If several hydraulic accumulators are connected to one or more hydraulic cylinders, then the total reservoir volume in them is greater than if only one hydraulic accumulator were connected. Such an increase in the reservoir volume leads to a lower combined spring rate. Adjusting the reservoir volume by connecting and disconnecting even identically pre-loaded individual hydraulic accumulators therefore allows adjustment of the spring rate to the immediate load condition. Thus, in the suspension according to the invention the spring rate of the hydro-pneumatic spring arrangement can be selected at will within broad limits.

The size of the effective reservoir volume and the value of the spring rate are approximately inversely proportional to each other. Hence, while the spring rate can be adjusted simply by connecting and disconnecting further hydraulic accumulators with the same gas pressure, if the range of spring rates is large a relatively large number of identical hydraulic accumulators would be required to do this.

A particularly preferred embodiment of the invention therefore uses hydraulic accumulators with differing pre-loads. Depending on the load supported and the system pressure applied thereby to the hydraulic cylinder, these can be connected or disconnected alone or in combination to attain a nearly ideal spring characteristic for all load conditions.

Similarly, the spring rate of a hydraulic accumulator increases with increased fill pressure (pre-load), while the spring deflection during load changes for a given fill pressure depends upon the reservoir volume in the accumulator. Thus, the desired spring deflection for the hydro-pneumatic spring system also can be adjusted at will within broad limits by connecting or disconnecting the hydraulic accumulators.

For example, various hydraulic accumulators with differing load capacities can be provided such that generally one or only two hydraulic accumulators are used for a particular range of loads. The static pressure can be determined by pressure sensors and used to operate control valves, through which the accumulator or accumulators appropriate to the particular range of loads are connected to the hydraulic cylinders. Such a design permits accumulator selection under static conditions (for example, when the vehicle is stopped). This is necessary since the dynamic pressures in a particular load condition might reach the pressure range that would cause the selection of a different hydraulic accumulator. For a well-designed spring system with a static load ratio of 12 between the largest and the smallest load, however, a relatively large number of such hydraulic accumulators again would be required.

An alternative design for the hydraulic accumulators allows a transition to be made even under dynamic conditions between hydraulic accumulators with different pre-loads, while simultaneously reducing the number of hydraulic accumulators necessary. In this design, three hydraulic accumulators are sufficient to cover the entire load range for the hydro-pneumatic spring system for the front axle of an agricultural tractor. In this design, at least one pressure reducing valve is provided in the supply line between each accumulator and the hydraulic cylinders to establish the upper limit of the operating range of the accumulator and at least one pressure limiting or relief valve is similarly provided in the return line to establish the lower limit of the operating range of the accumulator. A check valve also preferably is used in line with the pressure reducing valve and the relief valve.

The pressure reducing valves control the maximum operating pressure of the individual hydraulic accumulators. In each case they are located in the supply lines between the hydraulic cylinder and the hydraulic accumulator, so that flow is possible only when the pressure reducing valves allow it. If the system pressure (either statically or dynamically) exceeds the pressure allowable for the given hydraulic accumulator, then the pressure reducing valve blocks the supply line, and the accumulator is disconnected. From this point on the next hydraulic accumulator, which is designed for higher loads, takes over the spring action. This hydraulic accumulator is pre-loaded, for example, to a higher pressure than the hydraulic accumulator that was disconnected, but may be provided with an approximately equal nominal volume, thereby providing a substantially equal spring deflection. The hydraulic accumulator that was disconnected maintains its maximum pressure, since the oil cannot return to the system (which is at higher pressure). Thus, if the system pressure again drops to the upper limit of the operating range of the disconnected hydraulic accumulator, it still is filled with the maximum volume of oil and can take over from the higher pressure accumulator. If the system pressure drops further, then the maximum oil volume in this hydraulic accumulator is again bled off through the open relief valve in the return line. This allows for a transition between two hydraulic accumulators, during which theoretically no oil losses occur. For dynamic operating conditions, in particular, this means that during the transition from a first to a second hydraulic accumulator, the oil accumulated in the first hydraulic accumulator prior to disconnection is again completely released when the spring system returns to its static condition. When pressure increases the pressure reducing valve disconnects the hydraulic accumulator and connects it again upon decreasing pressure.

Similarly, the relief valves establish the minimum operating pressure for each individual hydraulic accumulator. They are each located in the return line between the hydraulic cylinder and the hydraulic accumulator, in which, preferably by the use of a check valve, flow is possible only from the hydraulic accumulator to the hydraulic cylinder. When the hydraulic accumulator is in operation, the associated relief valve is open to through flow. If the system pressure drops below the minimum pressure of the hydraulic accumulator, then the relief valve blocks the oil connection between the hydraulic cylinder and the hydraulic accumulator, which now contains a minimum volume of oil. When the pressure falls below this pressure limit, the oil flow returns to the hydraulic cylinder from the hydraulic accumulator with the lower pre-load that is designed for lower load conditions, which was filled to nearly its maximum volume before the higher pressure accumulator went on-line. When the pressure increases to a point that exceeds the minimum pressure of a hydraulic accumulator, oil is again forced into the hydraulic accumulator and the relief valve opens the return line under the effect of the pressure increase. If the system pressure increases beyond the pressure range of the hydraulic accumulator, then the check valve in the return line may remain open to through flow since no oil can escape from the hydraulic accumulator due to the higher system oil pressure. The check valve in the return line prevents flow of oil from the hydraulic cylinder into the accumulator.

As can be seen, the interplay between the relief valve of the hydraulic accumulator with a greater pre-load and the pressure reducing valve of the hydraulic accumulator with a smaller pre-load permits a smooth transition between the individual hydraulic accumulators under both static and dynamic conditions.

The pressure reducing valves and the relief valves are preferably automatic valves that sense the pressure of the associated hydraulic accumulator and automatically close or open upon exceeding or underrunning a pre-set pressure level.

An overlap preferably is established between the operating range of the hydraulic accumulator with a smaller pre-load with that of the hydraulic accumulator with the next higher pre-load to avoid dead zones in which no hydraulic accumulator is connected to the hydraulic cylinder due to the switching hysteresis in the valves. In this embodiment, the pressure limit of the relief valve of the hydraulic accumulator with the higher pre-load is somewhat lower than the pressure limit of the pressure reducing valve of the hydraulic accumulator with the lower pre-load. Generally, the required operating ranges and overlaps for the hydraulic accumulators and the associated valves will be established by testing.

Damping affects the spring characteristics of the vehicle. Damping systems with high damping rates assure good adhesion to the ground but reduce driving comfort. Lower damping rate provide more comfort but do not promote driving safety. A heavy, driven rigid axle requires higher damping forces due to its greater unsprung weight than an individual wheel suspension, to prevent oscillation of the wheels and the consequent loss of contact with the ground. Damping is conventionally accomplished by shock absorbers acting in parallel with the spring arrangement. They require space and tend to tilt. For a well-designed spring system the spring rate and the damping forces should be changed by approximately the same factor. The spring support for differing masses is accomplished according to the invention by connecting and disconnecting hydraulic accumulators. Damping can be made compliant with the differing masses in a similar manner, but this cannot be accomplished by conventional shock absorbers.

This problem is solved according to a preferred embodiment of the invention by a damping system provided between the hydraulic accumulators and the hydraulic cylinder which uses at least one load-sensitive throttling valve. The throttling valve permits automatic compliance of the damping force with the varying load conditions. The pressure drop across the throttling valve corresponds to the damping force. The damping system most appropriately contains at least one proportional throttling valve that is controlled by the hydraulic pressure bearing on the one or more hydraulic cylinders and at least one constant throttling restriction in line with the proportional throttling valve. Alternatively, the constant throttling restriction may be integrated into the proportional valve.

The damping system is appropriately provided with differing damping forces for spring compression and spring extension, where the damping forces during spring extension are considerably larger (for example three to four times as large) as they are during spring compression. Such a division between the extension and compression stages has the advantage that the spring system can rapidly and gently absorb intermittent shock loads due to uneven ground, and lets the resulting vibrations decay rapidly by virtue of the slow spring extension. Accordingly, a vibration of the axle about its center position also decays rapidly, and adhesion to the ground is improved.

The damping system preferably contains a supply and a return line between the hydraulic cylinder and the spring system, in each of which at least one proportional throttling valve, at least one constant throttling restriction and at least one check valve are arranged in sequence. (However, it is noted that through appropriate tuning of the proportional throttling valves and the constant throttling restrictions, it may be possible in a particular installation to eliminate the check valve in the return line between the spring system and the hydraulic cylinder.) The proportional throttling valves are controlled by the hydraulic pressure imposed on the hydraulic cylinder.

For certain tractor applications the spring system should have the ability to be blocked. Such applications may, for example, be heavy front loader or ground breaking operations. In ground breaking operations with a plow, the depth of the furrow to be plowed is controlled through the lifting system with respect to depth or force, depending on the configuration of the tractor. In this case a spring loaded front axle would compromise such control, since a spring-mounted tractor would not maintain a constant distance between the attached implement and the ground. Therefore it is advantageous to provide at least one controlled blocking valve between the pressure accumulators and the hydraulic cylinders to shut off the spring action, while still allowing pivoting of the front axle.

Under varying loads the spring system deflects to varying degrees. Changes in length can also be caused by expansion or shrinkage of the gas in the hydraulic accumulators of the spring system, e.g., due to temperature fluctuations and leaks in the hydraulic system. However, it is desirable for the tractor to maintain a constant height without regard to the load condition.

Accordingly, a preferred embodiment of the invention provides for a level control valve in a connecting line between the hydraulic cylinders and the spring system. The hydraulic cylinders can be selectively connected to a source of hydraulic pressure or a hydraulic return line by means of the level control valve, whereby the hydraulic pistons can be retracted or extended independent of the spring system. By this means the spring deflection for all implement arrangements of the tractor can be controlled, for example, to plus or minus 90 mm. The hydraulic system existing in the tractor can be used as source of hydraulic pressure. Its hydraulic pump can typically deliver, for example, 160 Bar. The hydraulic return line may end in an oil sump.

Preferably the supply line to the level control valve is provided with a constant throttling restriction and a check valve, and the return line from the level control valve is provided with a constant throttling restriction. The constant throttling restriction assures a slow oil flow in either direction. The check valve in the supply line prevents oil from escaping when the pressure source is connected and the dynamic system pressure in the spring system exceeds the maximum oil pressure of the hydraulic pressure source.

The level control valve is preferably controlled by a level control that contains a microprocessor. The microprocessor receives control signals from sensors that detect the height of the vehicle body above the wheel supports.

According to a preferred further development of the invention the height is established by a level control rod, one end of which is pivotally connected to the wheel support and whose other end runs in a generally vertical guide. The guide pivotally connected to the vehicle body. The level control rod is provided with at least one cam which interacts with at least two electric switches attached to the guide, and upon movement of the level control rod in the guide switching processes are performed in the switches when the cam moves past the actuators of the switches. In an analogous arrangement the guide can obviously be attached to the wheel support and the rod attached to the vehicle body. The switches may be mechanical or of a non-contacting configuration.

The attaching point of the level control rod is preferably a point on the wheel support, for example a rigid axle which feels the effect of pivoting motion as little as possible, since the level control should not react to pivoting motion. The kinematics of the suspension of a rigid axle do not usually result in a fixed pivot point about which the axle pivots. For the attachment of the level control rod, however, a point near the vertical centerline of the axle is preferred.

The optimum vertical attachment point for the level control linkage would be a location on the vehicle body vertically above the attachment point of the level control rod at the axle. Due to space restrictions this position frequently is not available, since this may be the location of a front power take-off shaft or the location may be used to accommodate the spring system accumulators and control valves. Accordingly a preferred further development of the invention provides for the attachment of the level control rod along the vertical centerline of a rigid axle, then the rod initially runs horizontally, for example, parallel to the rigid axle and is then angled off, for example, at 90° upward, so that the generally vertical section of the level control rod and the guide occupy a non-central location.

Two switches interact with a cam of the level control rod to establish an upper and a lower position limit. When these position limits are exceeded or underrun, the microprocessor automatically actuates the level control valve to supply pressurized oil to the hydraulic cylinders or to return it therefrom, and thereby raise or lower the vehicle body relative to the axle. This leveling action should occur only when the change of position takes place over longer time intervals and is not the result of short term vibrations.

The level control should respond to static load changes, to leakage losses or to temperature changes that produce volume changes in the hydraulic accumulators, but not to dynamic load changes due to vibrations. To attain this goal a further development of the invention provides for four switches generally arranged vertically above one another which can be actuated by the cam of the level control rod. The two central switches characterize the normal level position of the axle and are closed or opened upon load changes. If this switch position is maintained for a certain time interval, this points to a static load condition and the level control responds correspondingly.

In normal over-the-road operation, tractor vibration amplitudes of the front axle develop that do not cover the entire spring deflection path. Here the central two switches react to the vibration. The microprocessor detects the switch conditions over pre-determined time intervals and transmits corresponding control signals to the level control valve only after several time intervals, for example every 15 seconds, if the frequency of the switching conditions indicates that a deviation from the desired level has occurred. In this case the level control valve is actuated briefly in the desired direction and produces a step-by-step approach to the desired level position. This means that the level control does not respond to each vibration-induced change in the switching condition.

During large vibrations the two central switches can be switched uniformly, even though the vibration is not centered on the desired level. Therefore the signals from the two central switches cannot be utilized for the level control. Here the two outer switches have the advantage that they are arranged at a greater distance from the level position, preferably just beyond the vibration amplitude that is expected during normal over-the-road operations. If the front axle vibrates with large amplitudes about a position other than the desired level, then one of the outer switches is more frequently in a certain switching condition than the other switch and causes a level adjustment to be performed. On the other hand the two central switches indicate equal switching conditions.

For a compact design that occupies relatively little space, is easy to install and service and can be manufactured at low cost, the hydraulic components are combined into one valve block that includes pressure reducing valves, relief valves, proportional throttling valves, constant throttling restrictions, check valves, blocking valves and level control valves.

The rigid axle is preferably a steered axle which may also be a driven axle. A preferred application of the wheel suspension according to the invention is for spring mounted front axles of tractors which, for example, may perform pivoting motions about the longitudinal axis of the tractor through a pivot angle up to 12°.

BRIEF DESCRIPTION OF THE DRAWINGS

The invention will be described in greater detail with reference to the drawings, in which.

DETAILED DESCRIPTION OF THE PREFERRED EMBODIMENTS

Figure 1:
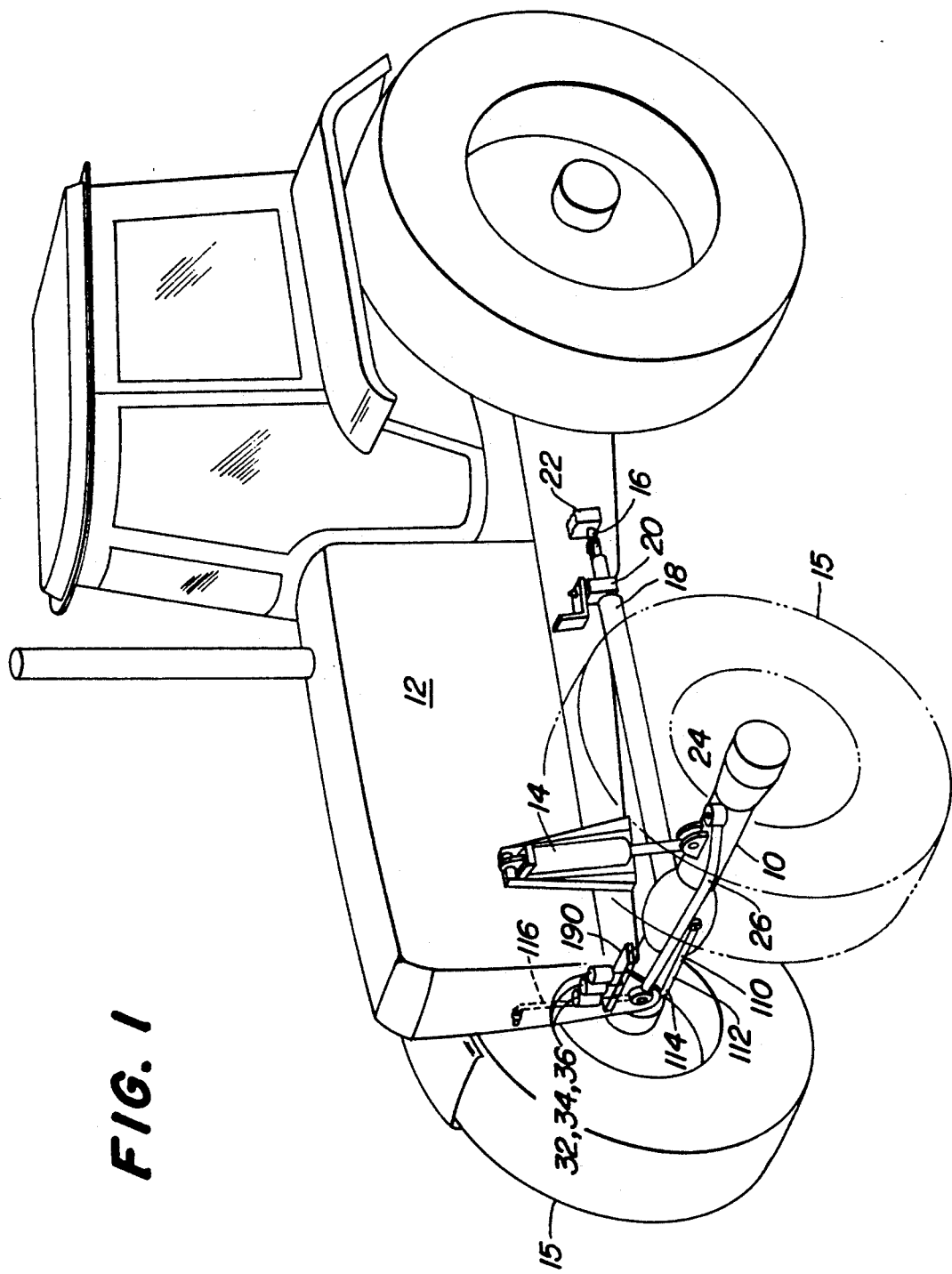
FIG. 1 is a perspective view of an agricultural tractor with a wheel suspension according to the invention.

The agricultural tractor in FIG. 1 is provided with a driven front axle (rigid axle) 10 which carries the spring-mounted forward part of the vehicle body 12 through two hydraulic cylinders 14, only one of which is shown. The front wheels 15 are attached at either end of the axle 10.

A compression tube 18 provides longitudinal guidance for the front axle 10 and absorbs the driving and swinging forces. A drive shaft 16 passes through the compression tube 18 and both are attached centrally to the front axle 10. The length of the compression tube 18 need not be the same as the length of the drive shaft 16. A shorter compression tube has the advantage that the first section of the drive shaft 16 from the gearbox 22 up to the compression tube attachment 20 can additionally be supported on the vehicle body 12. Such additional bearing support for the drive shaft 16 improves the vibration characteristics of the drive shaft 16, since the free vibrating length is shortened. In addition, changes in the length from the gearbox 22 to the beginning of the compression tube 18 due to differing gearbox variations may be accommodated by using different length rods for the first section of the drive shaft 16. The compression tube 18 and the attaching lug 24 for the hydraulic cylinders 14 then can be purely components of the front axle 10 package.

The length and angle of the drive shaft 16 and compression tube 18 may change with the changes in the position of the front axle 10. Such position changes are absorbed by a constant-velocity joint.

A Panhard rod (transverse steering arm) 26 is pivotally attached at one end to the vehicle body 12 and at the other end to the front axle 10. This steering arm absorbs the transverse forces between the front axle 10 and vehicle body 12.

Figure 2:
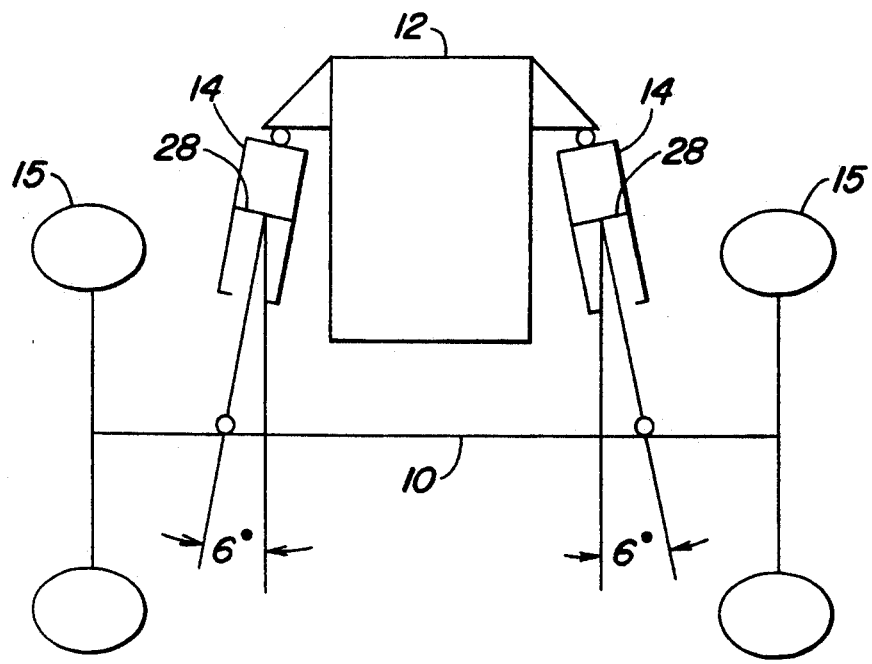
FIG. 2 shows the inclined position of the hydraulic cylinders of the wheel suspension system shown in FIG. 1.

Hydraulic cylinders 14 with hydro-pneumatic springs generally absorb the vertical forces between the vehicle body 12 and the front axle 10. The attachment of the hydraulic cylinders 14 to the vehicle body 12 and the front axle 10 is shown schematically in FIG. 2. The hydraulic cylinders 14 are inclined to the vertical at an angle of approximately 6° and diverge downward. This provides better sideways guidance to the front axle as against a straight vertical arrangement. To ensure adequate spring deflection of the hydraulic pistons 28 of, for example, 180 mm, the pivoting angle may be limited to a desirable maximum value (for example 12°). The maximum spring deflection can be limited by hydraulic stops or stops using elastomeric materials, as will be described further below.

Figure 4:
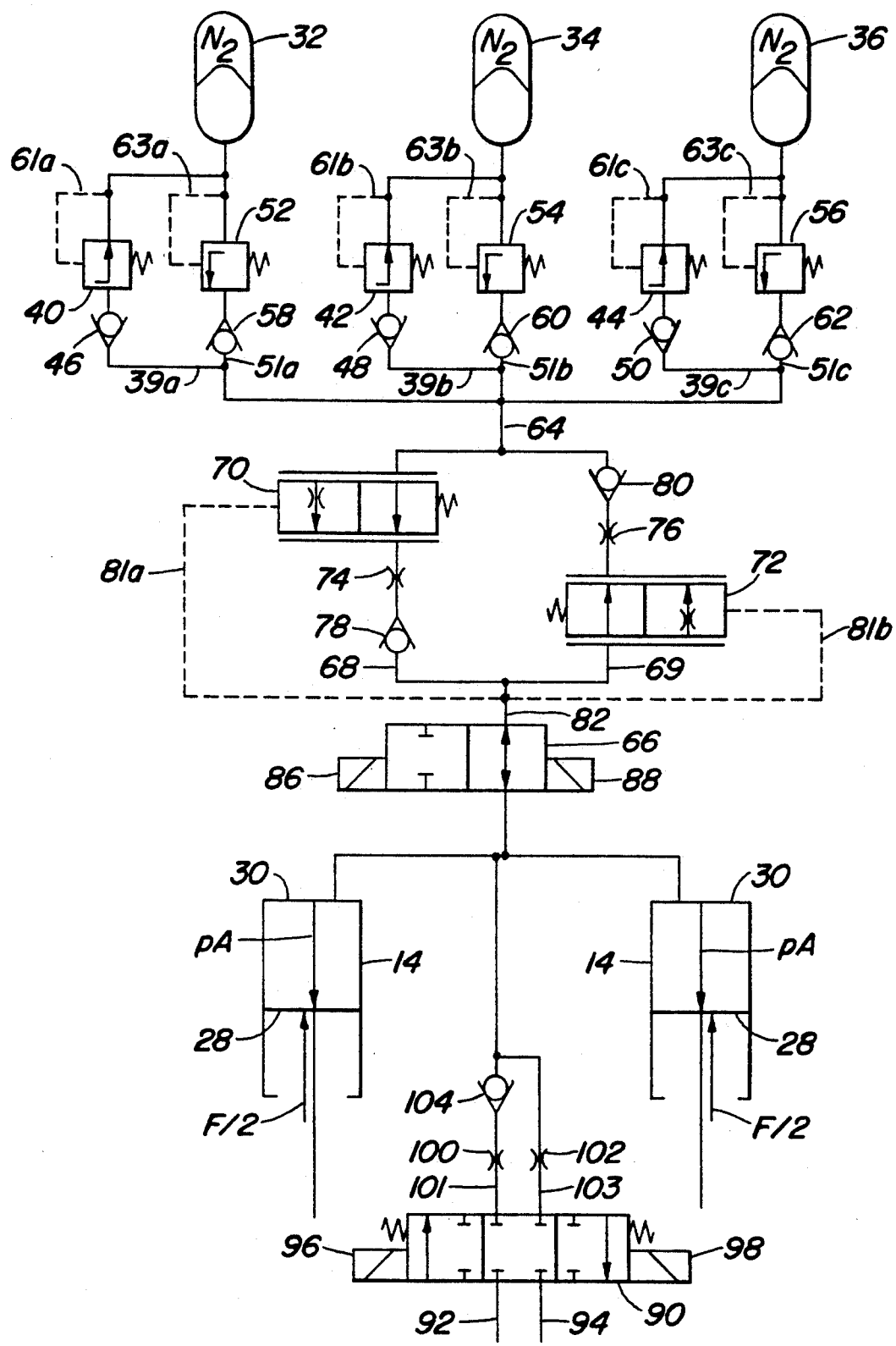
FIG. 4 shows the hydraulic circuit configuration for a spring damping system according to the invention.

FIG. 4 schematically illustrates the hydraulic circuit of the hydro-pneumatic spring system according to the invention with two single-acting hydraulic cylinders 14. One-half of the front axle load F/2 acts upon the lower side of each of the hydraulic pistons 28. The upper side of the hydraulic pistons 28 is loaded by a force that equals the product of hydraulic pressure p and piston area A. If the forces are equal (F/2=p×A), then the hydraulic pistons 28 are in equilibrium and do not move in the hydraulic cylinders 14.

The only chambers 30 on the upper Side of the pistons can be connected through the various valves selectively with three hydraulic accumulators 32, 34 and 36. Pressure accumulators per se are known, for example, from DE 36 09 534. During spring extension the oil chambers 30 become larger. The necessary oil volume is supplied by the connected pressure accumulators 32, 34, 36. The resulting expansion of the nitrogen gas in the pressure accumulators 32, 34, 36 lowers the pressure and therefore the force applied to the upper side of the pistons, so that an equilibrium condition is reached. During spring compression the processes described are reversed.

The three pressure accumulators 32, 34, 36 have different volumes and pre-loads. For example, the pressure accumulator 32 may have a nominal volume of 1.5 liters, an allowable operating pressure of 330 Bar and a gas pre-load of 43 Bar; the pressure accumulator 34 may have a nominal volume of 1.0 liters, an allowable operating pressure of 200 Bar and a gas pre-load of 18 Bar; and the pressure accumulator 36 may have a nominal volume of 1.3 liters, an allowable operating pressure of 50 Bar and a gas pre-load of 5.5 Bar. These pressure accumulators 32, 34, 36 permit absorption of differing static pressures between approximately 10 Bar and 120 Bar, and dynamic pressures between approximately 25 Bar and 275 Bar.

The three pressure accumulators 32, 34, 36 are each connected to a common line 64 through supply lines 39a, 39b, 39c, each of which contains one pressure reducing valve 40, 42, 44 in line with a check valve 46, 48, 50. The pressure accumulators 32, 34, 36 also are connected to the common line 64 through return lines 51a, 51b, 51c each of which contains a relief valve 52, 54, 56 in line with a check valve 58, 60, 62. The common line 64 leads to the hydraulic cylinders 14.

The pressure reducing valves 40, 42, 44 are pre-loaded by springs, and close automatically at a pre-set pressure inasmuch as they are connected through corresponding control lines 61a, 61b, 61c that sense the hydraulic pressure in the associated pressure accumulator 32, 34, 36 and that close the valve against the force of the spring upon reaching the pre-set pressure. For example, the closing pressure for the pressure reducing valve 40 may have a value of 320 Bar, the pressure reducing valve 42 a value of 100 Bar, and the pressure reducing valve 44 a value of 42 Bar. The check valves 46, 48, 50 prevent hydraulic oil from the pressure accumulators 32, 34, 36 from flowing through the supply lines 39a, 39b, 39c to the common line 64.

The relief valves 52, 54, 56 also are pre-loaded by springs and open automatically at a pre-set pressure inasmuch as they are each connected to control lines 63a, 63b, 63c that sense the hydraulic pressure in the associated pressure accumulators 32, 34, 36 and open the particular valve against the force of the spring upon reaching the pre-set pressure. For example, the opening pressure for the relief valve 52 may have a value of 90 Bar, for the relief valve 54 a value of 34 Bar and for the relief valve 56 a value of 6 Bar. The check valves 58, 60, 62 prevent hydraulic oil from the common line 64 from flowing through the return lines 51a, 51b, 51c to the pressure accumulators 32, 34, 36. The operation of the valves has already been described in the introductory description.

Figure 3:
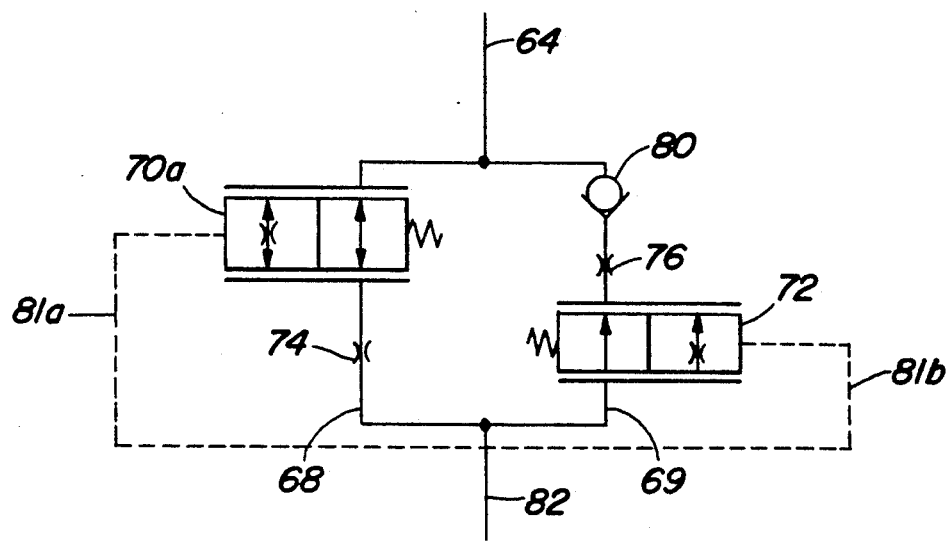
FIG. 3 shows the hydraulic circuit configuration for an alternate embodiment for load-controlled damping.

A load-sensitive damping system and a blocking valve 66 are inserted between the common line 64 and the oil chambers 30 of the hydraulic cylinders 14. Two alternatives are described below for the load-sensitive damping system (FIGS. 4 and 3). In both alternatives, the damping system contains a supply line 69 and a return line 68 containing two proportional throttling valves (70, 72 in FIG. 4, 70a, 72 in FIG. 3) hydraulically parallel to each other, each with a constant throttling restriction 74, 76 and, if required, each with a check valve 78, 80 in hydraulic sequence. The proportional throttling valves 70, 70a, 72 are pre-loaded by springs and in their rest position are unthrottled, that is open. The throttling valves are adjusted in proportion to the pressure existing in the line 82 leading to the hydraulic cylinders 14, since the pressure in the line 82 is transmitted to the proportional throttling valves 70, 70a, 72 through the control lines 81a, 81b to move the valve spools against the force of a spring. Since higher axle loads result in higher system pressures, higher damping factors are required for implement conditions with higher front axle loads. To obtain proper spring action during rapid changes in load, the control lines 81a, 81b may be throttled so strongly by the line cross section that the proportional throttling valves 70, 70a, 72 do not react to dynamic pressure increases and decreases.

The differences in the embodiments according to FIGS. 4 and 3 lie in the attainment of different damping in the compression and extension phases of the spring action. In the variant according to FIG. 4 the throttling restrictions for spring compression (compression phase) and for spring extension (extension phase) are separated by the check valves 78 and 80. The differing damping of the two phases is attained by a differing design of the throttling cross sections for spring compression and spring extension. In the variant according to FIG. 3, oil flows in both parallel lines 68 and 69 during spring compression. By blocking the one branch with the check valve 80, only one line 69 can carry oil flow during spring extension. Now the entire oil volume must flow through the throttling restrictions in this line 69. This results in higher damping during spring extension than damping during spring compression.

A blocking valve 66 is provided to block the spring action, for example, during plowing operations. The blocking valve 66 is an electrically operated 2/2 way valve (impulse valve). If the blocking valve 66 is actuated by the coil 86 from a push-button, not shown, then the spring accumulators 32, 34, 36 are separated from the hydraulic cylinders 14, and the spring action is blocked. Upon subsequent re-actuation of the push-button, the blocking valve 66 receives a control signal through the coil 88 and is switched to through flow, again placing the spring accumulators 32, 34, 36 in operation.

The blocking valve 66 is arranged between the damping system and the connection to a level control valve 90. This prevents the proportional throttling valves 70, 70a, 72 of the damping system from being actuated unnecessarily when spring action is blocked, but allows the level control valve 90 to be able to vary the oil volume in the hydraulic cylinders 14. In this manner, level control of the front axle 10 is allowed even when the spring action is blocked.

The level control valve 90 is an electrically-operated, spring-centered 4/3 way valve. In the center position, as shown, the oil circuit of the spring system is separated from a line 92 leading to the hydraulic pressure source of the tractor and a hydraulic return line 94. The level control valve 90 is in its center position when the level position is set as desired. If the level (oil volume) is to be corrected, the level control valve 90 can be actuated by the two coils 96, 98. The control position in which the coil 96 is energized results in an oil flow into the spring system (level increase). Oil flow out of the spring system (level decrease) results from energizing coil 98. The throttling restrictions 100, 102 in the fill line 101 and in the drain line 103 assure a slow approach to the desired level for both oil flow directions. A check valve 104 in the fill line 101 prevents escape of oil when the coil 96 is energized and the dynamic system pressure in the spring system exceeds the maximum oil pressure of the hydraulic pump of the tractor of, for example, 160 Bar.

Figure 5:
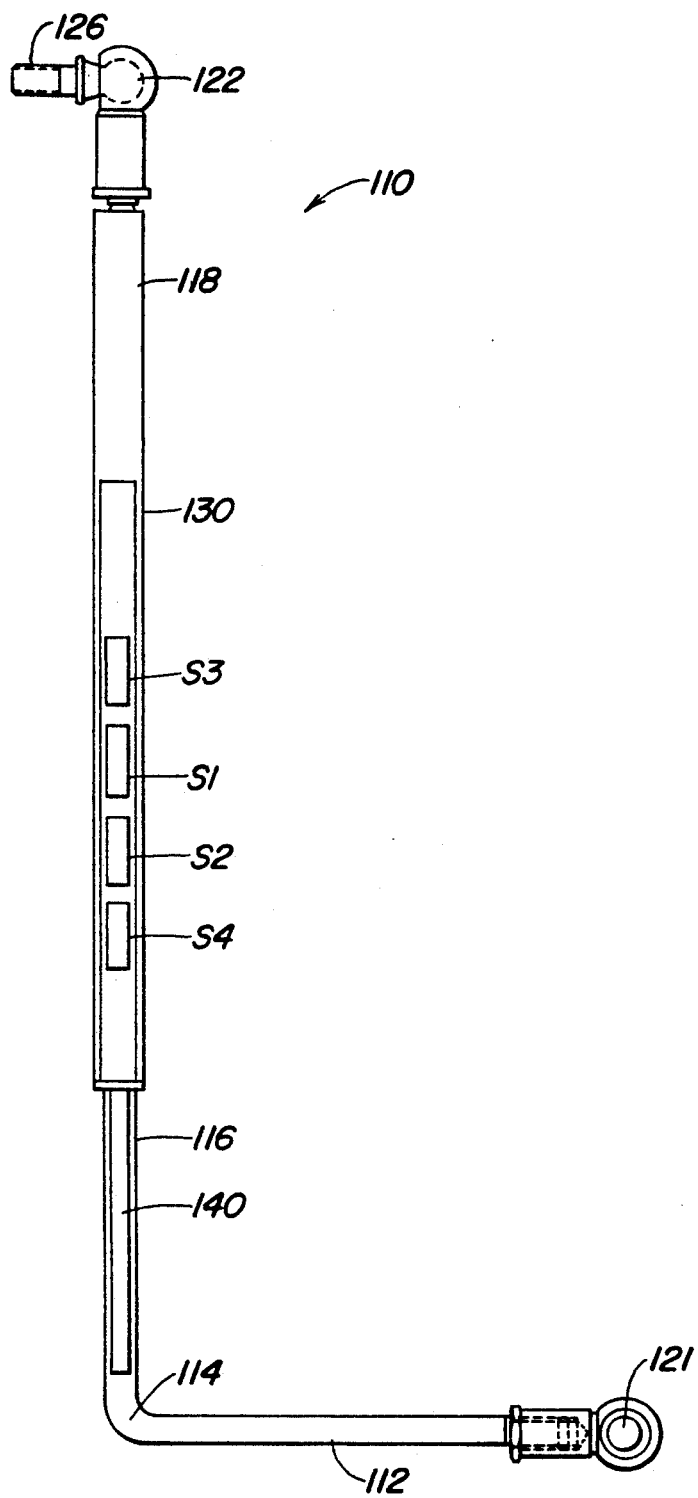
FIG. 5 shows a front view of a level control linkage.
Figure 6:
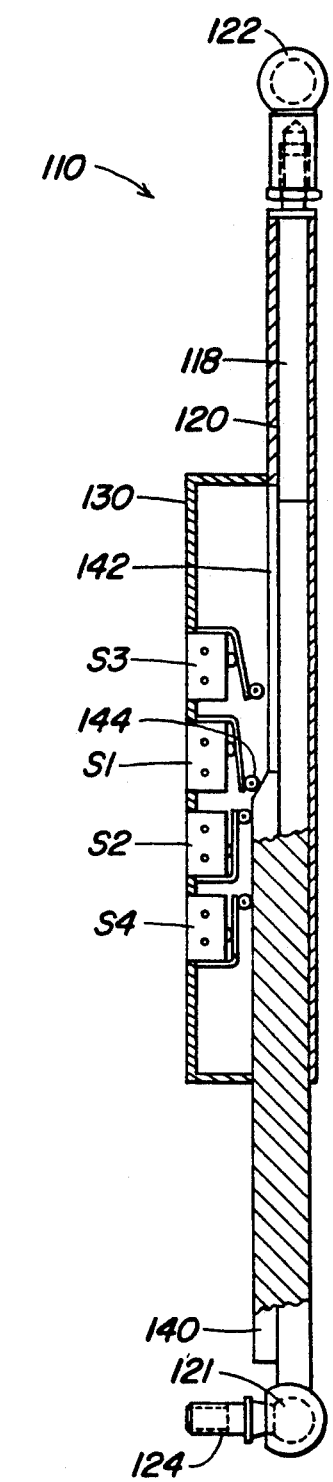
FIG. 6 shows a side view in partial section of the level control linkage of FIG. 5.

A level control rod 110 is provided for automatically sensing the height of the vehicle body 12 above the front axle 10. The right end as seen in FIG. 1 of the level control rod 110 is pivotally attached in the region of the vertical centerline of the front axle 10. The level control rod 110 itself is shown in greater detail in FIGS. 5 and 6. The first section 112 of the level control rod 110 extends generally horizontally and parallel to the front axle 10, up to a bend 114 from which the second section 116 of the level control rod 110 extends in a generally vertical direction. The vertically upward end of the level control rod 110 extends into a tubular guide 118 in which it can move axially. The upper end of the tubular guide 118 is pivotally attached to the inner surface of side component of the chassis of the vehicle body 12. The pivotal attachments to the front axle 10 and to the chassis use angle joints 121, 122, which are mounted to their respective components with threaded sections 124, 126.

The tubular guide 118 is configured generally as a hollow cylinder 120 and includes a housing 130 located towards the forward sideof the vehicle which engages the second section 116 of the level control rod. In the longitudinal direction of the cylinder the housing 130 carries four micro-switches S1, S2, S3, S4 arranged one above the other. These may be, for example, subminiature switches such as SE type switch made by the Honeywell Company. The hollow cylinder 120 guides the generally cylindrical second section 116 of the level control rod 110. A projection 140 extends beyond the cylindrical contour toward the forward side of the vehicle along a part of the second section 116. This projection is extends radially through a longitudinal slot 142 in the hollow cylinder 120. The upper end of the projection 140 is inclined and forms a cam 144 by means of which the switches S1, S2, S3, S4 can be actuated upon relative motion between the level control rod 110 and tubular guide 118, that is between front axle 10 and vehicle body 12.

Figure 7:
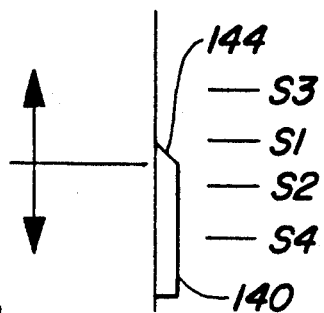
FIG. 7 shows a schematic diagram of the positions of the switches on the control linkage of FIGS. 5 and 6 with respect to the level position.
Figure 8:
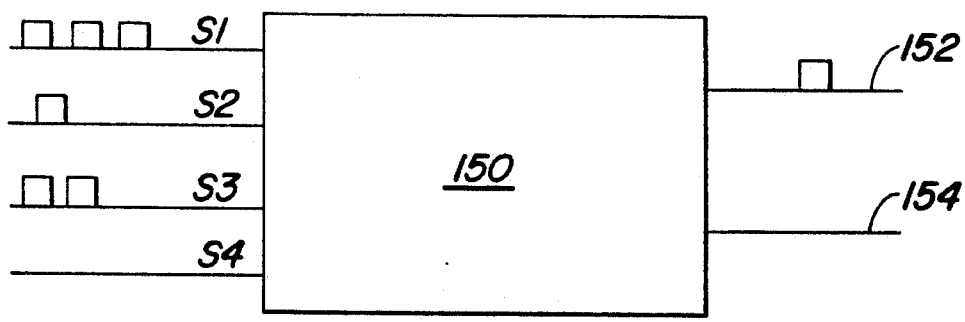
FIG. 8 shows a microprocessor with its connections.

Referring to FIG. 7, the switches S1, S2, S3, S4 operate as follows:

A response of the level control is required for static load changes (changes in the implement arrangement of the vehicle) and for position changes of the axle during operation due to leakage losses or due to volume changes of the nitrogen gas in the hydraulic accumulators 32, 34, 36. On the other hand the level control should not respond to short term vibrations. For such a control four switches S1, S2, S3, S4 are provided which are actuated by the cam 144 on the control rod 110. The two center switches S1, S2 are arranged to either side of the cam 144 when the desired level position is attained.

In this case the switch S1 is open and switch S2 is closed. Upon a load change the cam 144 moves from the level position, and either the switch S1 is closed (spring compression) or the switch S2 is opened (spring extension). Thus, the switch positions can be used directly for level control to compensate for static load changes, when dynamic changes are not occurring.

Dynamic changes produce vibrations that produce only a temporary change in the switch positions of the switches S1, S2. Such temporary signals should be suppressed, and not acted upon. For this purpose the switch positions are sensed at regular time intervals by a microprocessor 150 and evaluated. If over a predetermined time interval the switch S1 is in its open position more frequently than the switch S2 is in its closed position, this signifies that the vehicle body 12 must be raised. In this case the microprocessor 150 will transmit a control signal over the control line 152 to the coil 96 of the level control valve 90 to connect the hydraulic cylinders 14 to the hydraulic pressure system of the vehicle for a pre-set short time interval. If, on the other hand, the switch S2 is more frequently in its open position than the switch S1 is in its closed position, then the coil 98 is actuated through the control line 154 to release oil from the hydraulic cylinders 14 for a pre-set short time interval. If required this process can be repeated until the desired level position is attained. The throttling of the oil flow by the throttling restrictions 100, 102 permits the desired level position to be approached asymptotically. In a switch position that indicates a larger change in the static load and for which a larger oil volume difference is required for level equalization, oil control up to the point of the desired level can be performed in a single process.

Switches S1 and S2 alone may be inadequate when larger vibration amplitudes are encountered, since both switches S1 and S2 can deviate simultaneously from their level position switch positions, even though the front axle 10 is merely vibrating about the level position. Switches S3 and S4 therefore are provided at a greater distance to either side of the level position. The switches S3 and S4 are so located that they lie beyond the vibration amplitudes that are encountered in normal over-the-road operation. The distance between the level position and the switch S3 or S4 can, for example, be 10% of the total spring deflection in addition to the vibration amplitude encountered in normal over-the-road operation. In the desired level position the switch S3 is open and the switch S4 is closed. If the front axle 10 deviates from the desired level position during strong vibrations, then one of the two switches S3, S4 will deviate more frequently from its switching condition in the level position than the other switch S4, S3. At this time the switches S1 and S2 also deviate just as frequently from their switching condition in the level position. The microprocessor evaluates these switching conditions and actuates the level control valve 110 correspondingly.

The valves described above for the spring system, the damping, the level control and the blocking of the spring action preferably are combined in a valve bock 190. The valve block 190 is shown in FIG. 1 below the three hydraulic accumulators 32, 34, 36.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A wheel suspension for a vehicle having a vehicle body and a wheel-bearing axle, the suspension comprising:
   a. at least one hydraulic cylinder with a piston chamber and having one end mounted to the axle and another end mounted to the vehicle body to suspend the vehicle body on the axle;
   b. at least two hydraulic accumulators;
   c. valve means for selectively connecting none, one or more of said hydraulic accumulators to said piston chamber, said valve means comprising:
      i. a supply line from each hydraulic accumulator to said piston chamber;
      ii. at least one pressure reducing valve in each supply line, said pressure reducing valve closing said supply line when the line pressure in said piston chamber exceeds a pre-determined maximum operating pressure for the corresponding hydraulic accumulator;
      iii. at least one return line from said at least one hydraulic cylinder to each hydraulic accumulator; and
      iv. at least one pressure limiting relief valve in each return line, said relief valve closing said return line when the pressure in said piston chamber falls below a pre-determined minimum operating pressure for the corresponding hydraulic accumulator.

2. The wheel suspension of claim 1, wherein said at least two hydraulic accumulators have different preloads.

3. The wheel suspension of claim 1, wherein s first one of said hydraulic accumulators has a higher preload than a second one of said hydraulic accumulators, and wherein the switching pressure of the pressure reducing valve of the second hydraulic accumulator is greater than the switching pressure of the relief valve of the first hydraulic accumulator.

4. The wheel suspension of claim 1, further comprising damping means including at least one load-sensitive, controllable throttling valve in line between said accumulators and said piston chamber.

5. The wheel suspension of claim 4, wherein said damping means comprises at least one proportional throttling valve controlled by the hydraulic pressure in said piston chamber and at least one constant throttling restriction in series with said proportional valve.

6. The wheel suspension of claim 5, wherein said damping means further comprises at least one check valve in each supply and return line.

7. The wheel suspension of claim 1, further comprising a blocking valve in series between the accumulators and the piston chamber for selectively disconnecting the accumulators from the piston chamber.

8. The wheel suspension of claim 1, further comprising:
   a. a fill line providing a source of pressurized working fluid;
   b. a drain line for returning fluid to said source; and
   c. a level control valve for selectively connecting said fill line to said piston chamber to increase the volume of working fluid in said piston chamber and accumulators and for selectively connecting said drain line to said piston chamber to reduce the volume of working fluid an said piston chamber.

9. The wheel suspension of claim 8, further comprising a constant throttling restriction and a check valve in said fill line and a constant throttling restriction in said drain line.

10. The wheel suspension of claim 8, further comprising:
    a. sensor means for detecting the level position of the vehicle body relative to the axle and generating a signal representative thereof; and
    b. control means for controlling said control level valve to adjust the volume of fluid in said piston chambers and accumulators to adjust the level position to a predetermined position.

11. The wheel suspension of claim 10, wherein said sensor means comprises:
    a. a generally vertical guide pivotally connected to the vehicle body;
    b. a level control rod pivotally connected at one end to the axle and having another end which moves within said guide; and
    c. a plurality of switches provided on one of said guide and said rod which are activated and deactivated depending upon the relative positions of said guide and said rod, the opening and closing of said switches serving to generate said signal representative of the position of the axle relative to the vehicle body.

12. The wheel suspension of claim 11, wherein said level control rod is pivotally mounted to the axle at the axle's vertical centerline, and wherein the level control rod is substantially L-shaped so that the vertical portion of the level control rod is offset from the axle's vertical centerline.

13. The wheel suspension of claim 1, wherein two hydraulic cylinders are provided between the axle and the vehicle body, arranged in parallel hydraulic circuits with said accumulators.

14. The wheel suspension of claim 13, wherein said hydraulic cylinders are position at an angle relative to the axle.

* * * * *

UNITED STATES PATENT AND TRADEMARK OFFICE
CERTIFICATE OF CORRECTION

PATENT NO. : 5,271,632
DATED : 21 December 1993
INVENTOR(S) : Dr. Fritz Glaser et al.

It is certified that error appears in the above-indentified patent and that said Letters Patent is hereby corrected as shown below:

In Col. 13, line 20, delete "line", (second occurrence).

In Col. 13, line 36, delete "s" and insert -- a --.

In Col. 14, line 15, delete "an" and insert -- in --.

Signed and Sealed this

Seventeenth Day of May, 1994

Attest:

BRUCE LEHMAN

*Attesting Officer*      *Commissioner of Patents and Trademarks*